March 2, 1926.
W. A. ANDERSON
SOLAR HEATING ELEMENT
Filed Sept. 15 1924
1,575,309
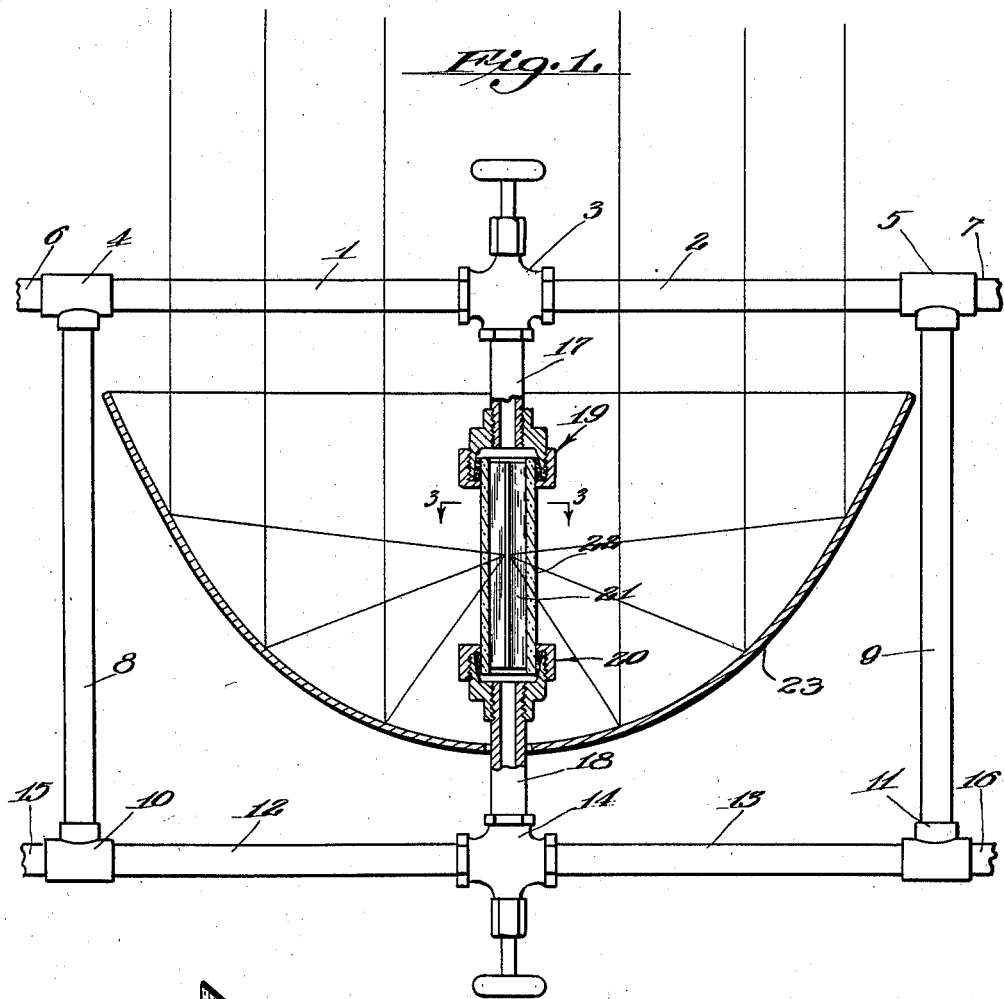
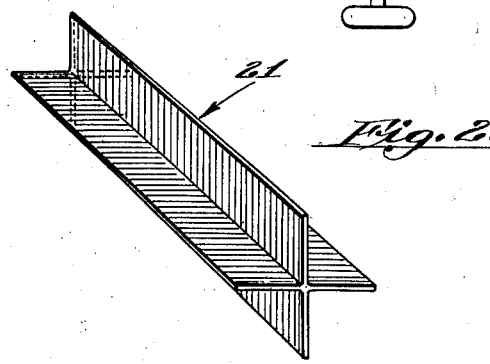
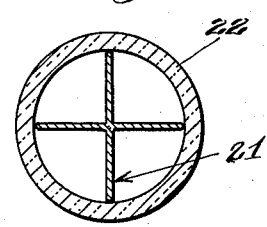
Inventor
W. A. Anderson
by Hazard and Miller
Attys Patented Mar. 2, 1926.

1,575,309

UNITED STATES PATENT OFFICE.

WILLIAM A. ANDERSON, OF LOS ANGELES, CALIFORNIA.

SOLAR HEATING ELEMENT.

Application filed September 15, 1924. Serial No. 737,838.

*To all whom it may concern:*

Be it known that I, WILLIAM A. ANDERSON, a citizen of the United States, residing at Los Angeles, in the county of Los Angeles and State of California, have invented new and useful Improvements in Solar Heating Elements, of which the following is a specification.

This invention is a solar heating element and consists of the novel features herein shown, described and claimed.

An object of the invention is to make a solar heating element for use, singly or collectively, in heating water or generating steam from concentrated rays of the sun.

Specifically, the main object is to make a solar heating element in which water flows between transparent glass and a light absorbing heating member so that concentrated rays of light will pass through the glass and through the water and be baffled and absorbed by the heating member and heat accumulated, and the water heated by convection, conduction and radiation from the heating member.

Other objects and advantages will appear from the drawings and specification.

The drawings illustrate a simple form of the invention.

Figure 1 is a sectional elevation of a solar heating element embodying the principles of my invention, the element mounting being shown as broken out of a system carrying a collection of the heating elements.

Fig. 2 is a perspective of the light absorbing heating member removed from the heating chamber.

Fig. 3 is a cross section on the line 3—3 of Fig. 1.

The details of construction and operation shown in the drawings are as follows:

Pipe sections 1 and 2 are connected to the ends of the cross valve 3. T's 4 and 5 are connected to the outer ends of the pipe sections 1 and 2 and pipe sections 6 and 7 extend outwardly from the T's 4 and 5. Pipe sections 8 and 9 extend downwardly from the sides of the T's 4 and 5. T's 10 and 11 are connected to the lower ends of the pipe sections 8 and 9. Pipe sections 12 and 13 connect the T's 10 and 11 to the cross valve 14. Pipe sections 15 and 16 extend outwardly from the T's 10 and 11.

The valves 3 and 14 are in transverse alignment. The pipe sections 1 and 2, the T's 4 and 5, and the valve 3 are a part of the outlet or hot water or steam line; the T's 10 and 11, the pipe sections 12 and 13, and the valve 14 are a part of the inlet or cold water line; and the pipe sections 8 and 9 are return connections from the hot line to the cold line, and also serve as braces to hold the lines together. The pipe sections 6, 7, 15 and 16 are parts of adjacent mountings for adjacent heating elements.

A pipe nipple 17 extends downwardly from the cross valve 3 and a pipe nipple 18 extends upwardly from the cross valve 18. A water glass union 19 is fixed upon the lower end of the nipple 17 and a water glass union 20 is fixed upon the upper end of the nipple 18.

A light absorbing heating member 21 is placed in a water glass 22 and the water glass 22 carrying the member 21 is mounted in the unions 19 and 20. The water glass 22 is transparent and serves as a tube to connect the nipples 17 and 18 and complete the line of circulation from the cold line to the hot line.

The heating metal 21 is metal and opaque, preferably black, and cross shaped in end elevation and closely fills the water glass, so that light rays passing through the glass and water will strike the heating member and be baffled and absorbed and the accumulated heat transferred to the water by convection, conduction and radiation.

The sun light reflector 23 is mounted around the nipple 18 and extends outwardly and upwardly so as to focus the sun rays upon the glass 22 and through the glass 22 and through the water between the glass and the heating member 21 upon the heating member and thereby heating the water.

The cross valves 3 and 14 provide means for cutting the individual element out of the circulation in case of trouble such as the glass breaking.

While I have shown a circular glass tube or water glass as forming the heating chamber, it is to be understood that I am not limited to this form of heating member. It is only necessary that the water should flow or be held between glass and a light-absorbing, heat-accumulating member and that the concentrated light rays be directed through the glass and water against the heating member. It is better, but not necessary, that the heating member be surrounded by water to catch the radiation and prevent loss of heat.

In the usual method of producing steam by the heat from solar radiation, converging light from reflectors is focused upon a black opaque metal boiler, the exterior walls absorbing the radiant energy and converting it into heat, which is then conducted through the walls to the liquid within. As conduction is a slow process, and the quantity of heat conducted depends upon the difference in temperature of the exterior and the interior surface of the wall, the exterior surface of the boiler must be kept at a much higher temperature than the liquid within the boiler. This high temperature of the exterior surface and the large surface required by reason of the slowness of conduction causes great loss of heat by radiation and convection from the outer surface, leaving very little surplus heat for useful work.

The water glass 22 forms a boiler and heat is rapidly generated in the interior of the boiler from an exterior radiant source. Focusing reflectors direct the light rays upon a transparent boiler, sufficiently small in diameter to withstand heavy internal pressure. Within the transparent boiler, immersed in the liquid, is a light-absorbing, light-obstructing barrier, made of thin opaque, light-absorbing material, so constructed as to afford the greatest obstruction to light while occupying a small space, leaving the liquid to circulate freely between the barrier and the walls of the boiler. The converging light from the reflectors, passing through the walls of the boiler, strike against the barrier in the liquid, is absorbed by the barrier and converted into heat and the heat immediately absorbed and carried away by the liquid. As the heat is generated in the interior of the boiler and absorbed by the liquid, the outer surface can be heated only by conduction of heat from the liquid through the walls of the boiler, and as the flow of heat by conduction depends on the difference in temperature between the inner and the outer surface of the boiler wall, the outer surface of the boiler will always be at a lower temperature than the liquid contained within. This results in a great saving of heat usually lost by radiation and convection from the outer surface of externally heated boilers in which the outer surface must be at an extremely high temperature for the rapid conduction of heat to the liquid within.

A further advantage of this invention is that the heat intake in the form of radiant energy is instantaneous, and the quantity of radiant heat that may be received through a small area of boiler wall is limited only by the practical focusing range of the reflectors and capacity of the boiler to carry away the heated liquid. After the liquid has attained the desired temperature, the heat intake may be increased as far as practical without any further increase in the loss of heat by radiation and convection from the outer surface of the boiler, provided the temperature of the liquid be kept constant by drawing off the hot liquid for useful work.

Having thus described my invention, what I claim as new and desire to secure by Letters Patent from the United States is as follows, express reservation being made of permissible modifications.

I claim:

1. In a solar heater of the character described, the combination of a transparent vessel and a light-absorbing barrier within the vessel, the fluid to be heated being in contact with the transparent vessel on the inside thereof.

2. In a solar heater of the character described, the combination of a transparent vessel, a light-absorbing barrier within the vessel, and means for conveying fluid into and out of the vessel, the fluid to be heated being in contact with the transparent vessel on the inside thereof.

3. In a solar heater of the character described, the combination of a transparent vessel, a light-absorbing barrier within the vessel, means for focusing light upon the barrier, and means for conveying fluid into and out of the vessel, the fluid to be heated being in contact with the transparent vessel on the inside thereof.

4. In a solar heater of the character described, the combination of a transparent vessel, a light-absorbing barrier within the vessel, means for focusing light upon the barrier, and means for conveying fluid into and out of the vessel, the fluid to be heated being in contact with the transparent vessel on the inside thereof.

5. In a solar heater of the character described, the combination of a transparent vessel, a light-absorbing barrier within the vessel, a reflector focused upon the barrier, and means for conveying fluid into and out of the vessel, the fluid to be heated being in contact with the transparent vessel on the inside thereof.

6. A solar heating element in which water is held between a transparent body and a light-absorbing body so that light may pass through the transparent body and through the water to the light-absorbing body.

7. A solar heating element having a transparent glass tubing, a light absorbent heating element in the tube, an inlet and outlet for fluid, the fluid to be heated being contained within the tube and in contact with the glass.

8. A solar heating element comprising lines of tubing containing heated and cold water, return connections between the lines, a connection for an upflow of fluid between the lines, including a transparent tube having a light absorbing heating element in the tube, the water to be heated being in contact with the inside of the transparent tube.

9. A solar heating element comprising lines of tubing containing heated and cold water, return connections between the lines and serving as braces, a connection for an upflow of fluid between the lines including a transparent glass tube, a light absorbing element in the tube and valves for cutting the upflow connection out of the circulation, the water to be heated being in contact with the inside of the transparent tube.

In testimony whereof I have signed my name to this specification.

WM. A. ANDERSON.